United States Patent [19]
Ōyashiki et al.

[11] Patent Number: 5,671,012
[45] Date of Patent: Sep. 23, 1997

[54] CONTROL METHOD AND CONTROL SYSTEM FOR HIGH SPEED INTRODUCTION OF INTENDED FOREGROUND SUBJECT IN CAMERA PICTURE

[75] Inventors: Masahiko Ōyashiki; Ryosuke Nishiguchi; Hidenori Kawamura, all of Tokyo, Japan

[73] Assignee: NEC System Integration & Construction, Ltd., Tokyo, Japan

[21] Appl. No.: 524,276

[22] Filed: Sep. 6, 1995

[30] Foreign Application Priority Data

Feb. 16, 1995 [JP] Japan .................. 7-053577

[51] Int. Cl.$^6$ .................................. H04N 5/232
[52] U.S. Cl. ................................. 348/211; 348/143
[58] Field of Search ....................... 348/207, 211, 348/212, 213, 214, 239, 143, 169; 396/77, 78; H04N 5/232

[56] References Cited

U.S. PATENT DOCUMENTS 4,714,959 12/1987 Pshtissky .................. 348/184
5,396,287 3/1995 Cho ........................... 348/211
5,568,183 10/1996 Cortjens et al. ............. 348/15

FOREIGN PATENT DOCUMENTS 2266237 10/1990 Japan .
419411 7/1992 Japan .

*Primary Examiner*—Andrew Faile
*Assistant Examiner*—Tuan V. Ho
*Attorney, Agent, or Firm*—Joseph C. Mason, Jr.; Louise A. Foutch

[57] ABSTRACT

A control method and a control system are disclosed, which allow high speed introduction of an intended foreground subject in a camera picture, and in which by designating a given position of a picture displayed on the screen of a CRT with an external input the position can be moved to the screen center or to a predetermined position, while enlargement and contraction are made automatically. The operation is thus simple, less movement of eyesight is required, no operation error is committed, and a large number of cameras can be connected with a small-size and easily operable system.

6 Claims, 3 Drawing Sheets

1 ··· Monitor
1a ··· Monitor screen
2e ··· Field of sight of camera
3 ··· Controller
4 ··· Point input unit
5a ··· Camera
5b ··· Camera rack
7 ··· Foreground subject
7a, 7b ··· Foreground subject 1 — Monitor
1a — Monitor screen
2e — Field of sight of camera
3 — Controller
4 — Point input unit
5a — Camera
5b — Camera rack
7 — Foreground subject
7a, 7b — Foreground subject

CONTROL METHOD AND CONTROL SYSTEM FOR HIGH SPEED INTRODUCTION OF INTENDED FOREGROUND SUBJECT IN CAMERA PICTURE

BACKGROUND OF THE INVENTION

1. Field of the Invention

This invention relates to a camera control system for displaying picture data obtained from a television camera on the monitor screen of a CRT or the like. More specifically, the invention concerns a monitor camera system for monitoring facilities involving danger, such as buildings, offices, convenience stores, large size shops, banks and other financial organs, power plants and so forth, and also factories and like production facilities, or a camera or a system used therefor such as a television conference camera, a weather camera, a viewing camera, etc.

2. Prior Art

Heretofore, in such type of television control system, for instance, the operator gives control signal to a camera support by operating control buttons or the like provided in a control unit while watching camera picture displayed on a separate display such as a CRT, thus changing the sight field direction of the camera or enlarging or contracting the camera picture size in case of a camera having a zooming function.

In the prior art control system noted above, however, since the camera picture display and the controller are disposed independently, the operator has to give eyesight alternately to the two units, the operation is rather cumbersome, requiring great time for introducing an intended foreground subject and dictating great fatigue of the operator.

Further, the button operation requires a certain degree of skill, and the operation may be done erroneously to fail in correct change of the sight field direction of the camera to the direction of introducing the intended subject or cause opposite zooming.

Further, where a plurality of cameras are used, it is necessary to provide the corresponding number of controllers or provide a switching unit for switching the cameras, thus increasing the size of the overall system, increasing the installation space thereof and increasing the degree of complication of the operation. Therefore, it is difficult to greatly increase the number of cameras that the used together.

SUMMARY OF THE INVENTION

The invention is made in view of the above circumstances, and its object is to provide a control method and a control system for allowing high speed introduction of a foreground subject in a camera picture, in which by designating a given position on a picture displayed on the screen of a CRT or the like with an external input the designated position is moved to the center of the screen or a predetermined position thereon, while enlargement or contraction of the display size is made automatically, thus permitting simple operation, requiring less eyesight movement and eliminating operation error.

Another object of the invention is to provide a control method and a control system for allowing high speed introduction of a subject in a camera picture, which permit connection of a number of cameras by using a small size and easily operable system.

To attain the above objects of the invention, there is provided a method, which comprises the steps of:

designating an intended foreground subject 7a displayed on a monitor screen 1a with a point input unit 4;

inputting picture angle data from a camera 5a;

calculating the per-dot angle of the monitor screen 1a from the picture angle data;

calculating the distance (or dot number) on the monitor screen between the screen center and the designated subject 7a;

calculating the relative angle difference by multiplying the distance (or dot number) by the calculated per-dot angle; and using the relative angle difference directly or obtaining absolute value data thereof as camera movement data.

When an enlargement extent has been set in advance, new picture angle data is obtained from this enlargement extent, the new picture angle data thus obtained being sent out to the camera 5a when sending out the camera movement data.

Further, a plurality of cameras can be connected via an overlay circuit 8 and a switching circuit 9 to the monitor 1 such that necessary cameras 5a can be connected automatically.

Further, there is provided a control system for allowing high speed introduction of an intended subject in a camera picture, which comprises a camera 5a, for converting a foreground subject 7 into a picture signal, a camera support 5b for causing revolution of the camera 5a, a monitor 1 for displaying picture signal from the camera 5a on a monitor screen 1a, a point input unit 4 for designating an intended subject 7a displayed on the monitor screen 1a, and a controller 3 connected to the camera 5a, the monitor 1 and the point input unit 4, the intended subject 7a displayed on the monitor screen 1a being designated with the point input unit 4, the per-dot angle of the monitor screen 1a being calculated from picture angle data input from the camera 5a, the distance (or dot number) on the monitor screen 1a between the center thereof and the designated subject 7a being calculated.

the relative angle difference data being calculated by multiplying the calculated distance (or dot number) by the calculated per-dot angle, the relative angle difference data thus obtained being transmitted directly to the camera support 5b, or absolute value data being obtained from the relative angle difference data to be transmitted as camera movement data to the camera support 5b.

In this system, a plurality of cameras 5a are connected via an overlay circuit 8 and a switching circuit 9 to a controller 3 such that necessary cameras 5a can be connected automatically.

The camera 5a converts the subject 7 into a picture signal to be sent to the monitor 1. The camera 5a further has an enlarging/contracting function. Specifically, it has a function of automatically enlarging the picture with a predetermined magnification factor of 4, 8, 16, etc. according to a control signal from the controller 3 and sending out the present picture angle data to the controller 3. The camera support 5b has a function of causing revolution of the camera 5a in vertical and horizontal directions according to a control signal from the controller 3 and sending out sight field direction data to the controller 3.

The point input unit 4 designates the intended subject 7b displayed on the monitor screen 1. The controller 3 is connected via the camera 5a and camera support 5b to the point input unit 4 for providing control signals to and receiving necessary data from the camera 5a and camera support 5b.

In the controller 3, the enlargement factor of the camera 5a or the like can be set in advance from the monitor screen 1a and point input unit 4. With the magnification factor set in this way, when introducing an intended subject into the camera picture, the subject can be enlarged to the magnification that has been set.

DETAILED DESCRIPTION OF THE PREFERRED EMBODIMENT

Figure 1:
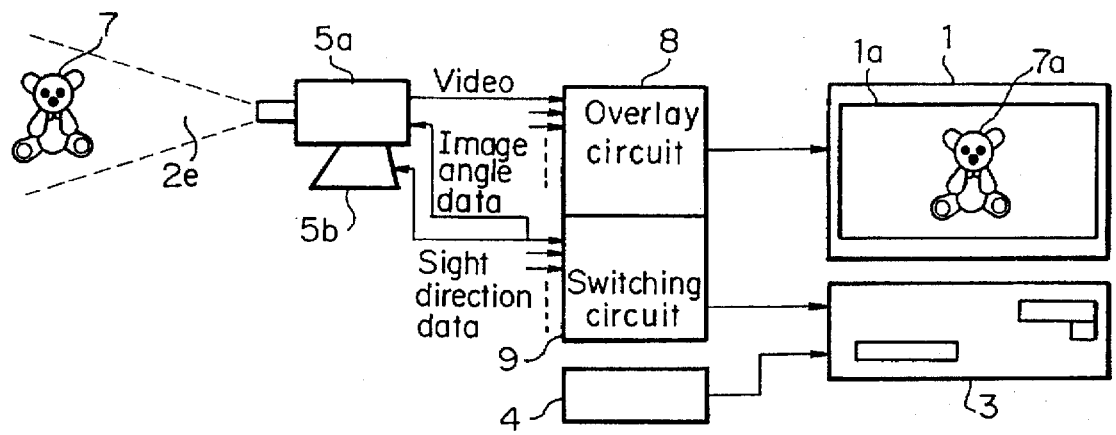
FIG. 1 is a view showing an example of system for carrying out the invention.

Now, a typical embodiment of the invention will be described with reference to the drawings. FIG. 1 is a view showing the basic structure of an embodiment of the control system according to the invention. Referring to the Figure, reference numeral 1 designates a monitor for displaying picture signal from a camera and having a monitor screen 1a. On the monitor screen 1a, either a single picture signal from a single camera or a plurality of picture signals from a plurality of cameras are displayed. Reference numeral 8 designates a controller. In this embodiment, a personal computer or like data processing unit is used as the controller 8. Reference numeral 4 designates a point input unit, which may be a mouth, a touch panel, etc. capable of designating a desired position on the monitor screen 1a.

Typically shown is a camera 5a which is like the usual television camera for converting a video input into a picture signal. Further, the camera 5a is capable of freely setting enlargement and contraction with well-known means by receiving picture angle data from a controller 3. The present picture angle data is read out from the controller to be sent out as a predetermined picture angle signal.

The camera 5a is supported on a camera support 5b such that it can be revolved up and down and also to left and right according to a predetermined control signal from the controller 3. The camera support 5b accommodates a pulse motor or a servo motor, an encoder and a controller for controlling such motor and encoder. It can be revolved by a number of steps calculated from movement data from the controller 3, with one step being less than the resolution that is required for performance necessary for carrying out the invention. According to a signal read out from the controller 3, stored movement pulse number data and encoder data are sent out as sight field direction data to the controller 3.

The sight field of the camera is indicated at 2e, and it is varied according to enlargement or contraction, i.e., the picture angle. Usually, video in the camera sight field 2e is converted into a picture signal for display on the monitor screen 1a. That is, an intended foreground subject 7a in the camera sight field 2e is displayed on the monitor screen 1a, and this subject 7a displayed on the monitor screen 1a is designated by a point input unit 4.

Figure 4:
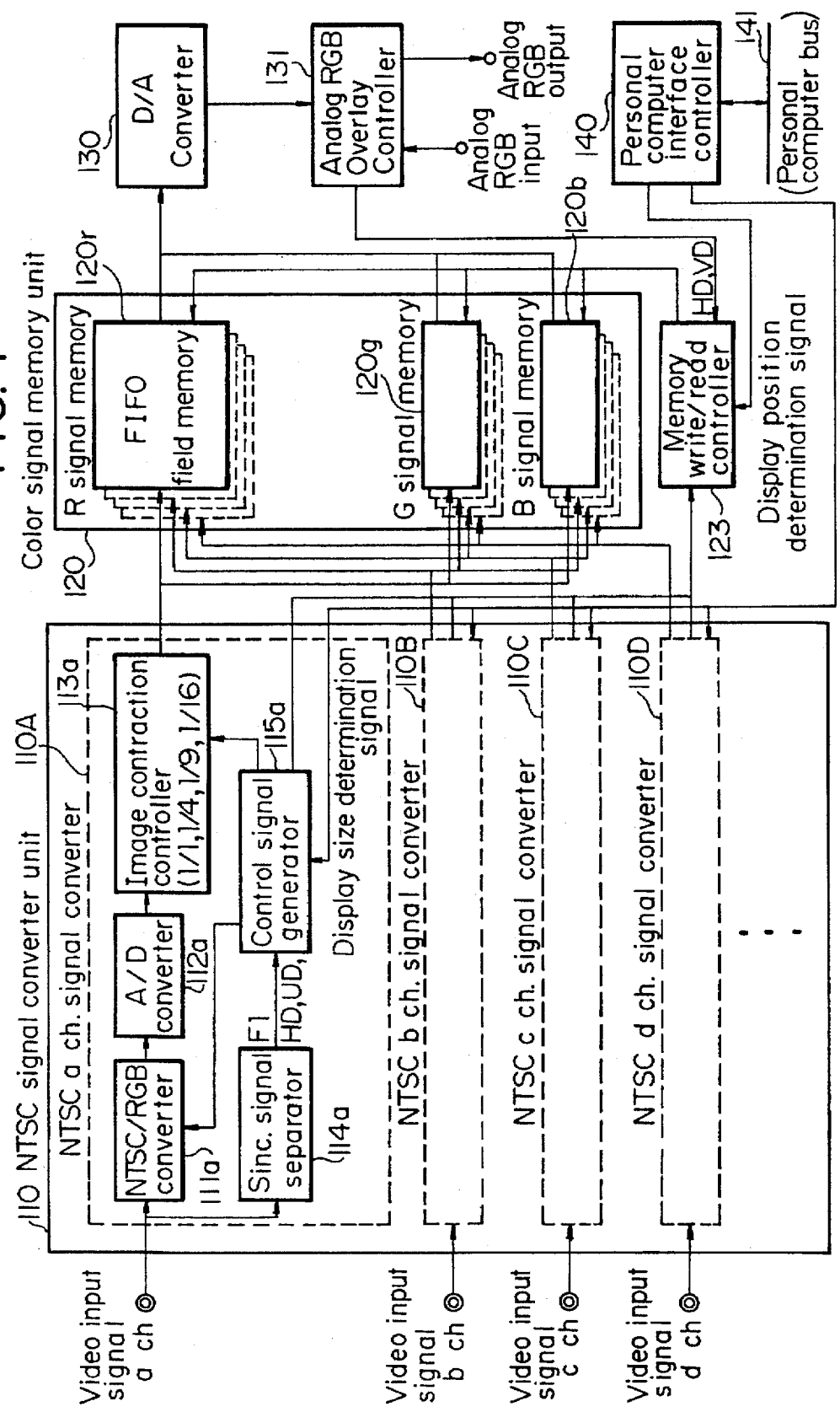
FIG. 4 is a schematic representation of a structure example of overlay circuit.

Reference numeral 8 designates an overlay circuit for overlaying NTSC signals supplied as picture signal from the camera 5a on the monitor screen 1a. This circuit has a structure as shown in FIG. 4. Individual video inputs are coupled through an NTSC signal converter unit 110, a color signal memory unit 120, a digital-to-analog converter 130 and an overlay circuit 131 for contraction and combination to be displayed on a single screen. Each of individual channel NTSC signal converters 110A, 110B, . . . of the unit 110 includes an NTSC/RGB converter 111a for converting the video input signal into R, G and B signals. The R, G and B signals thus obtained are converted in an analog-to-digital converter 112a into digital signals for contraction in a contraction controller 113a to a predetermined contraction factor before being stored in an R, a G and a B memory 120r, 120g and 120b in the color signal memory unit 120. Further, a synchronizing signal separator 114a separates synchronizing signals from the video input, the separated synchronizing signals being input to a control signal generator 115a for taking synchronization of various processes. The picture display position, etc. is controlled by a personal computer, i.e., controller 3, via a personal computer interface controller 140.

On the monitor screens a predetermined content, such as a map of a cite of monitoring, is displayed. The picture signal from the camera 5a is displayed in correspondence to the camera installation cite on the map. Reference numeral 9 designates a switching circuit which is used for data of the camera 5a, camera support 5b and controller 3 for each camera 5a.

Figure 3:
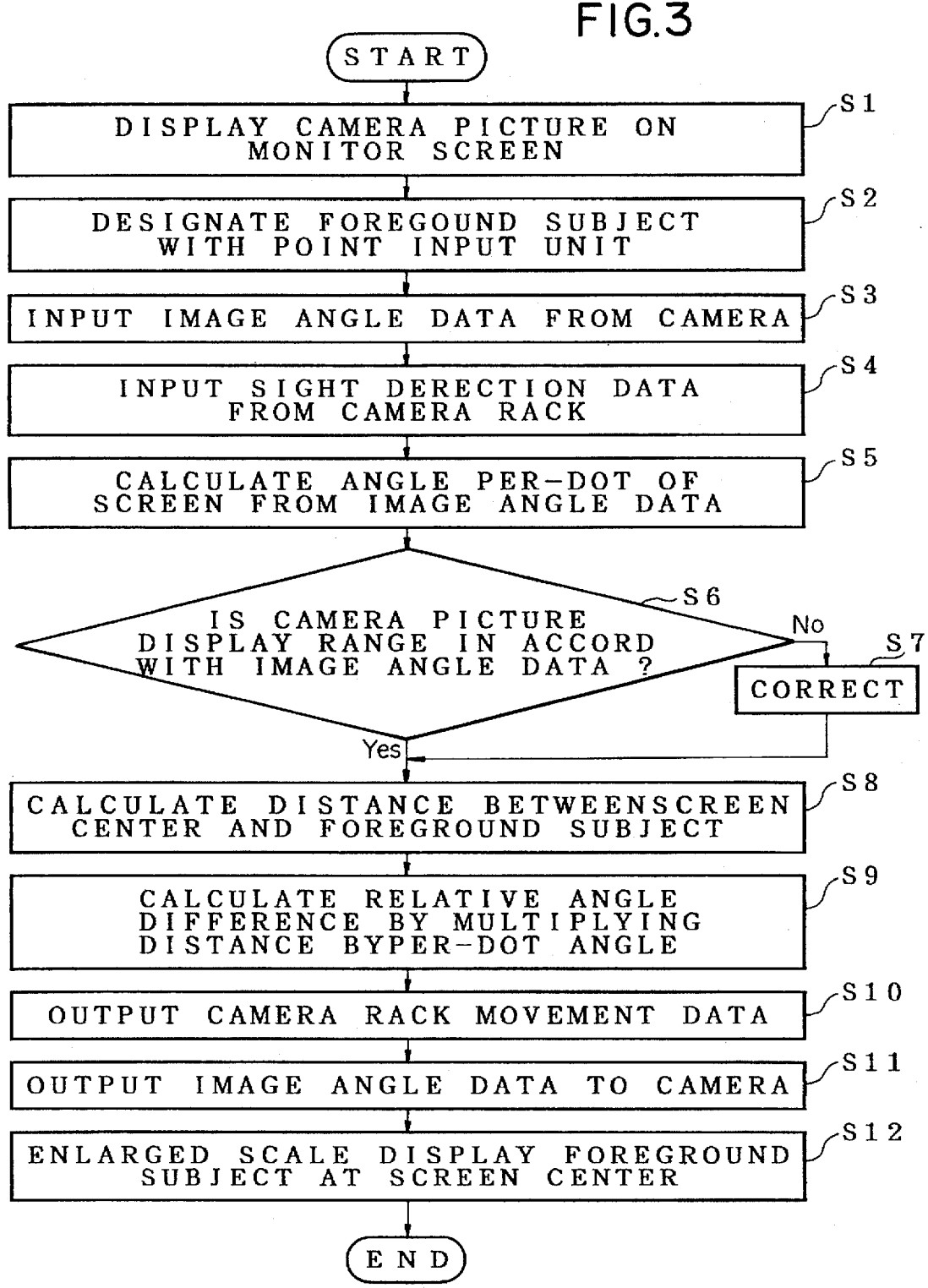
FIG. 3 is a flow chart illustrating a method embodying the invention.

Now, the method of control according to the invention will be described with reference to the flow chart of FIG. 3. In this example, picture signals from a plurality of cameras 5a are displayed on the monitor screen 1a, and an intended foreground subject in one of the displays thus produced is displayed by enlarged scale display on a central part of the screen.

Now, it is assumed that a picture signal from a selected camera 5a is displayed on the monitor screen 1a. The video that is picked up by the camera 5a contains the intended foreground subject 7, which is displayed as subject 7a on the monitor screen 1a (step S1).

For displaying the subject 7a by enlarged scale display on the screen center, the subject 7a is designated with the point input unit 4. Where a mouse is used as the point input unit 4, the cursor on the screen is moved to be clicked on the intended subject. Where a touch panel is used as the unit 4, the intended subject displayed on the screen is touched with a touch pen or a finger. Like operation is done in cases of other input means (step S2).

A controller 3 sends out a read signal to the selected camera 5a and receives picture angle data therefrom (step S3). Further, if necessary, camera sight field direction data is received from the camera support 5b (step S4).

Then, the per-dot angle of the monitor screen 1a is calculated from the dot number of the display width of the monitor screen 1a and the input picture angle data (step S5).

At this time, if the display range of the picture signal taken out from the camera 5a on the monitor screen 1a is different from the camera picture signal display range which must be obtained from the input picture angle data (step S6), a correction coefficient has been obtained in advance, and the per-dot angle of the monitor screen 1a is corrected using this coefficient (step S7).

The controller derives coordinate data of the center of the monitor screen 1a and the position of the subject 7a designated by the point input unit 4, and the distance between the two, i.e., the dot number, is calculated from these coordinate data.

The distance (or dot number) data thus obtained is multiplied by the per-dot angle obtained in the step S5, thus obtaining the relative angle difference between the screen center and the designated subject 7a (step S9).

This relative angle difference data is sent out from the controller 3 as relative displacement data with respect to the camera support 5b. At this time, if it is necessary to provide the displacement as an absolute value, absolute value data is produced from the sight field direction data obtained in the step S4 and the relative angle difference and is sent out (step S10).

Where enlargement or like factor has been set in advance, the controller 3 obtains new picture angle data from the present picture angle data and the enlargement and sends this data to the camera 5a (step S11).

Figure 2:
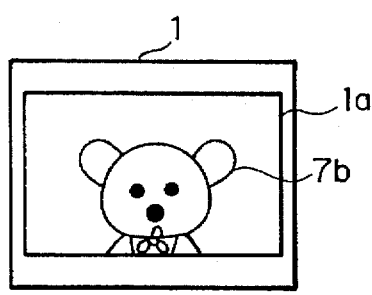
FIG. 2 is a view showing a monitor screen, on which a foreground subject is displayed by enlarged-scale display at the center.

A pulse motor or a servo motor is set horizontally and vertically on a mounting section of the camera 5a on the camera support 5b, and it is operated in direction and distance designated by the sight field direction data. The camera 5a has its sight field direction directed to the designated subject 7, and it is set to a predetermined enlargement by well-known means according to picture angle data provided from the camera 5a. In this way, the designated subject 7a is displayed by enlarged scale display on the center of the monitor screen 1a (step S12). FIG. 2 shows the subject 7b that is displayed by enlarged scale display on the center of the monitor screen.

In this example, one of displayed picture signals from a plurality of cameras 5a is selected to display the intended subject in the selected picture by enlarged scale display on the screen center. However, the invention is applicable as well to other cases, for instance a case with a single monitor screen for a single camera.

As has been described in the foregoing, according to the invention a desired position of a picture displayed on the monitor screen can be designated on the display with an external inputs thus simplifying the operation of moving a given position on the screen to the center thereof or to a predetermined position. Thus, the operator is less required to move eyesight, is less fatigued and commits no operation error. Further, it is made possible to connect a large number of cameras with a small-size easily operable system.

Further, with enlargement and contraction made automatically according to an extent of enlargement which has been set in advance, the operation is simplified, and the operator is less required to move eyesight, is less fatigued and commits no operation error.

Further, since a plurality of cameras are connected via a switching circuit to an overlay circuit, it is made possible to connect a large number of cameras by using a small-size and easily operable system and readily control these cameras.

What is claimed is:

1. A control method of allowing high speed introduction of an intended subject in a camera picture comprising the steps of:

designating an intended foreground subject displayed on a monitor screen with a point input unit;

inputting picture angle data from a camera;

calculating the per-dot angle of the monitor screen from the picture angle data;

calculating the distance or dot number on the monitor screen between the screen center and the designated subject;

calculating the relative angle difference by multiplying the calculated distance or dot number by the calculated per-dot angle; and using the relative angle difference directly or obtaining absolute value data thereof as camera movement data.

2. The control method of allowing high speed introduction of an intended subject in a camera picture according to claim 1, wherein when an enlargement extent has been set in advance, new picture angle data is obtained form the enlargement extent, the new picture angle data thus obtained being sent out to the camera when sending out the camera movement data.

3. The control method of allowing high speed introduction of an intended subject in a camera picture according to claim 1, wherein a plurality of cameras can be connected via an overlay circuit and a switching circuit to a controller such that necessary cameras can be connected automatically.

4. The control method of allowing high speed introduction of an intended subject in a camera picture according to claim 2, wherein a plurality of cameras can be connected via an overlay circuit and a switching circuit to a controller such that necessary cameras can be automatically connected.

5. A control system for allowing high speed introduction of an intended subject in a camera picture, comprising a camera for converting a foreground subject into a picture signal, a camera support for causing revolution of the camera, a monitor for displaying picture signal from the camera on a monitor screen, a point input unit for designating an intended subject displayed on the monitor screen, and a controller connected to the camera, the monitor and the point input unit, the intended subject displayed on the monitor screen being designated with the point input unit;

the per-dot angle of the monitor screen being calculated from picture angle data input from the camera, the distance or dot number on the monitor screen between the screen center and the designated subject being calculated, the relative angle difference being calculated by multiplying the calculated distance or dot number by the calculated per-dot angle, the relative angle difference data thus obtained being transmitted directly to the camera support, or absolute value data being obtained from the relative angle difference data to be transmitted as camera movement data to the camera support.

6. The control system for allowing high speed introduction of an intended subject in a camera picture according to claim 5, wherein a plurality of cameras are connected via an overlay circuit and a switching circuit to a controller such that necessary cameras can be connected automatically.

* * * * *